United States Patent [19]

Roberts

[11] 4,086,888

[45] May 2, 1978

[54] ELECTRONIC VACUUM MODULATOR FOR CONTROLLING AIR FLOW TO A THROTTLE MODULATOR MECHANISM FOR LIMITING ENGINE SPEED AND VEHICLE SPEED

[75] Inventor: William J. Roberts, Toledo, Ohio

[73] Assignee: Eltra Corporation, Toledo, Ohio

[21] Appl. No.: 662,279

[22] Filed: Feb. 27, 1976

[51] Int. Cl.² .............................................. F02P 9/00
[52] U.S. Cl. ................................ 123/102; 180/105 E; 307/96; 361/236
[58] Field of Search ...................... 123/102, 118, 103; 180/105 E; 307/96, 97; 317/5

[56] References Cited

U.S. PATENT DOCUMENTS

| | | | |
|---|---|---|---|
| 3,332,406 | 7/1967 | Perry et al. | 180/105 E |
| 3,560,854 | 2/1971 | Moss et al. | 123/102 |
| 3,700,996 | 10/1972 | Gutting | 123/102 |
| 3,789,810 | 2/1974 | Satter | 123/102 |
| 3,811,418 | 5/1974 | Sakakibara | 123/102 |

Primary Examiner—Ronald B. Cox
Attorney, Agent, or Firm—Robert H. Johnson; Oliver E. Todd, Jr.

[57] ABSTRACT

An electronic vacuum modulator is disclosed for controlling air flow to a throttle valve modulator mechanism for limiting the maximum speed of an engine and, optionally, for also limiting the maximum vehicle speed. An electric signal having a frequency proportional to engine speed is converted into an electric signal which smoothly and progressively controls a solenoid valve as the engine speed increases over a narrow range at a predetermined maximum engine speed. The valve is controlled such that the modulator mechanism progressively closes a carburetor throttle valve in the engine to limit the engine speed by limiting the available power. Optionally, a vehicle speed signal also is converted into an electronic signal which smoothly and progressively controls the solenoid valve as the vehicle speed increases over a narrow range at a predetermined maximum vehicle speed.

4 Claims, 7 Drawing Figures

ELECTRONIC VACUUM MODULATOR FOR CONTROLLING AIR FLOW TO A THROTTLE MODULATOR MECHANISM FOR LIMITING ENGINE SPEED AND VEHICLE SPEED

BACKGROUND OF THE INVENTION

This invention relates to vehicle engine controls and more particularly to an improved electronic control for limiting the maximum speed of an internal combustion engine and, optionally, for also limiting the maximum running speed of a vehicle in which the engine is operated.

It is sometimes either desirable or necessary to limit the maximum speed at which an internal combustion engine is operated. Typical early speed limiting systems used a centrifugal governor which gradually decreased the output power from an engine as the engine speed increased over a relatively wide range. Such systems were undesirable for engines used in motor vehicles since they greatly reduced the output power or acceleration available from the engine long before the maximum engine speed was reached. More improved systems function to limit the engine speed only when the engine is operating within a narrow range of the predetermined maximum speed. Such systems do not limit or restrict the output power from the engine until the engine is operating within the speed limiting range. One typical prior art system disclosed in U.S. Pat. No. 2,867,196, which issued Jan. 6, 1959 to Francis, involves the use of a vacuum modulator which controls the setting of a throttle valve within a high speed carburetor throat. A centrifugal mechanism is mounted on the rotating shaft of the ignition distributor to progressively block an orifice as the speed of the engine is increased over a narrow high speed range. As the orifice is blocked, the increasing vacuum moves a piston in the vacuum modulator to progressively close the carburetor throttle valve as the engine speed is progressively increased over the narrow speed regulating range. However, the installation of a system of this type on an engine requires the installation of a special ignition distributor.

Similar arrangements have been used for limiting the maximum speed at which a vehicle may be operated. U.S. Pat. No. 3,811,418, which issued May 21, 1974 to Sakakibara, discloses a vehicle speed limiting system in which a vacuum actuated piston or cylinder is connected to position a throttle valve within a high speed carburetor throat. Normally, the throttle valve is maintained fully open to permit the engine to operate under full power. When the vehicle exceeds a predetermined maximum speed, a speed responsive switch intercoupled with the vehicle's speedometer is closed. When the switch closes, a solenoid valve is energized to control vacuum in the vacuum cylinder, thereby causing the throttle valve to move to a position blocking the high speed carburetor throat. When the vehicle speed decreases below the predetermined maximum speed, the solenoid actuated valve is de-energized and the throttle valve opens to permit the engine to again operate at higher speeds. Since the speed responsive switch is either fully open or fully closed, hunting about the predetermined maximum vehicle speed as the throttle valve is alternately opened and closed will occur in a system of this type.

Generally, prior art engine speed limiters were operated either to control the maximum speed of the vehicle or the maximum operating speed of the engine. Such systems were not adaptable to controlling both the maximum engine speed and the maximum vehicle speed. However, at times it is desirable to take into account both the engine speed and the vehicle speed when controlling an engine. For example, take a vehicle which is driven at 70 mph when the engine is operating at 4000 rpm. If the engine is limited to operate at 4000 rpm and the engine does not reach its peak torque or horsepower output until 5000 rpm, for example, then the peak output power of the engine cannot be utilized in lower gear ranges, since the engine can never exceed 4000 rpm. On the other hand, if the engine is controlled to limit the maximum vehicle speed to 70 mph, it will be possible to exceed safe engine speed ranges in lower gear ranges without exceeding 70 mph.

SUMMARY OF THE INVENTION

According to the present invention, an electronic control is provided for a solenoid actuated valve which controls air flow to a modulator mechanism which positions a carburetor throttle valve for limiting the maximum speed of an internal combustion engine. The engine is provided with a throttle valve which controls air flow through a high speed carburetor throat or venturi. The throttle valve is positioned by means of a modulator mechanism which includes a vacuum actuated piston or diaphragm which is spring biased to normally open the throttle valve. A vacuum, either from a port in the carburetor or from the intake manifold, or from some other suitable source, is connected to the working side of the modulator mechanism. The working side of the modulator mechanism is also vented to the atmosphere through a normally open solenoid actuated valve. The engine generates a low voltage signal having a frequency proportional to the engine speed. This signal may be taken, for example, from a conventional electronic ignition system, or from any other suitable signal generator. The signal is conditioned and used to charge a capacitor to a voltage dependent upon the signal frequency. When the engine is operated at a speed below a predetermined narrow high speed range, the charge on the capacitor is maintained at a predetermined low level. As the engine speed is gradually increased within the narrow range to a predetermined maximum speed, the charge on the capacitor is correspondingly increased to a maximum level. Above the predetermined maximum speed, the charge on the capacitor is maintained at the maximum level. The level of the charge on the capacitor controls a pulse rate modulator which pulses the solenoid controlled vacuum valve. When the vacuum valve is open, the throttle valve in the high speed carburetor throat is held open by a modulator mechanism. As the vacuum valve is progressively energized, the throttle valve is progressively closed by the modulator mechanism to progressively reduce the available power from the engine and, as a consequence, to limit the maximum engine speed. The pulse rate modulator is controlled such that substantially no current flows through the solenoid winding when the capacitor is charged to the predetermined low level, a substantially continuous current flows through the solenoid winding when the capacitor is charged to the maximum level, and an intermediate average current flows through the solenoid winding for intermediate charge levels on the capacitor.

When vehicle speed limiting also is required, a signal generator is connected to the vehicle to generate a speed signal proportional in frequency to the velocity at which the vehicle is traveling. This signal is used to drive a buffer amplifier between a nonconducting state when the vehicle speed is below a predetermined narrow high speed range, to an increasingly conductive state as the vehicle speed increases over the narrow range to a predetermined maximum speed, and to a fully conductive state when the vehicle speed exceeds such predetermined maximum speed. The buffer amplifier is connected to charge the capacitor to the maximum level when in a fully conductive state, regardless of the engine speed, whereby the pulse rate modulator controls current flow through the solenoid winding in response to the maximum vehicle speed to limit available power from the engine and thereby to limit the maximum vehicle speed.

Accordingly, it is an object of the invention to provide an electronic control for limiting the maximum speed of an internal combustion engine.

Another object of the invention is to provide an electronic control for limiting the maximum speed of an internal combustion engine and also for limiting the maximum speed of a vehicle in which such engine is operated.

Other objects and advantages of the invention will become apparent from the following detailed description, with reference being made to the accompanying drawings.

DESCRIPTION OF THE PREFERRED EMBODIMENTS

Figure 1:
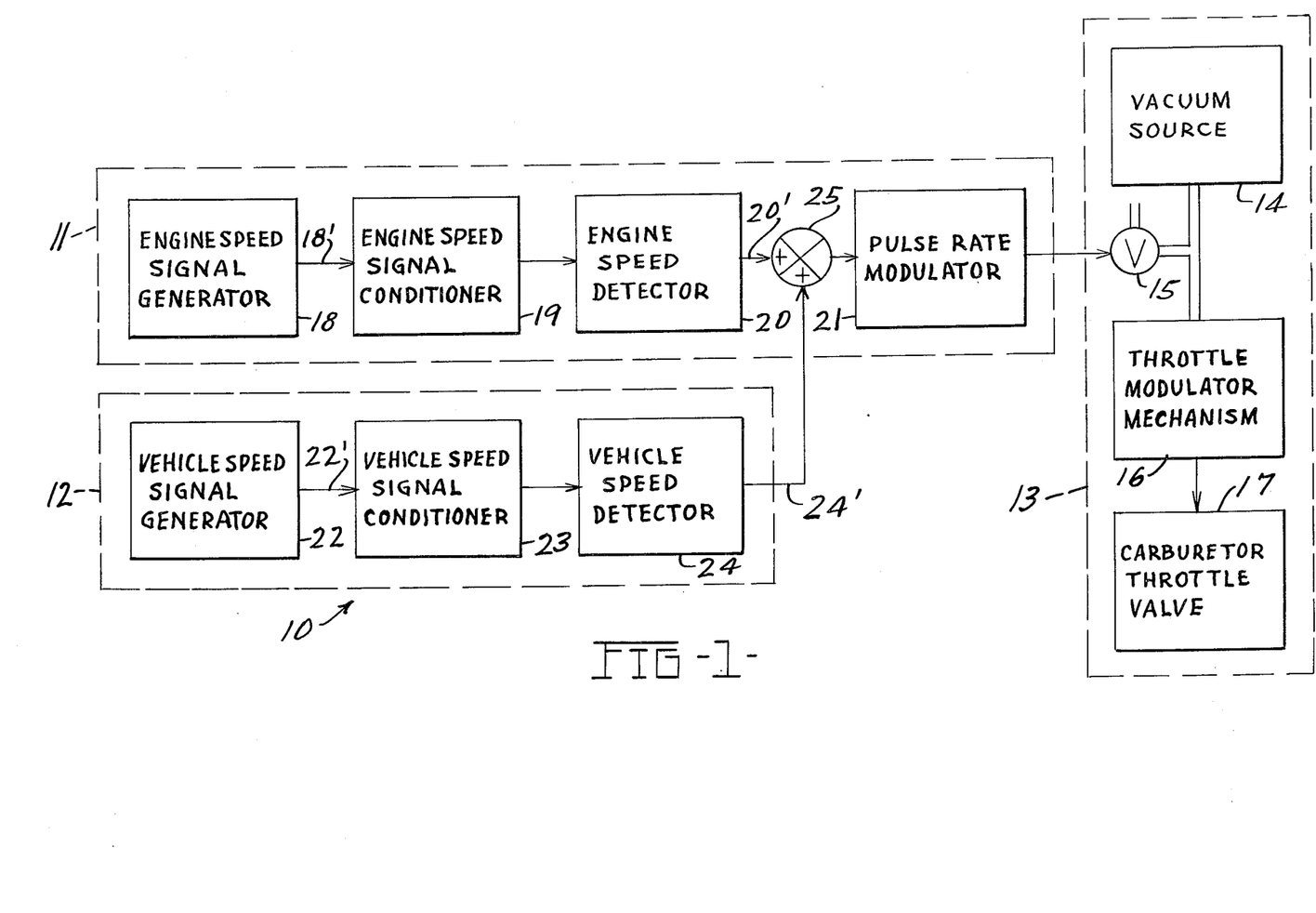
FIG. 1 is a schematic block diagram of an electronic vacuum modulator circuit for controlling air flow to a throttle valve modulator mechanism for limiting the maximum speed of an engine and the maximum speed of a vehicle in which such engine is operated constructed in accordance with the present invention.

Turning now to the drawings and particularly to FIG. 1, an improved control 10 is shown for limiting the maximum speed at which an internal combustion engine may be operated and also for limiting the maximum speed at which such engine may drive a vehicle in which it is operated. The control 10 basically comprises an electronic vacuum modulator circuit 11 for generating an engine speed control signal, an optional electronic vacuum modulator circuit 12 for generating a vehicle speed control signal and a control signal responsive pneumatic mechanism 13 for limiting air flow through an engine carburetor. The pneumatic mechanism 13 includes a vacuum source 14 which may, for example, consist of an opening or port in the carburetor throat or venturi, or, preferably, a line connected to one or more locations having orifices communicating with the intake manifold for the engine (not shown). The vacuum source is connected to the working side of a throttle modulator mechanism 16, also known as a vacuum motor. The working side of the throttle modulator mechanism 16 is also vented to the atmosphere through a normally open solenoid actuated valve 15. The vent preferably is connected through a filter (not shown) such as the engine's regular air cleaner. The throttle modulator mechanism 16 consists either of a piston mounted in a cylinder to be moved against a spring biasing force upon the application of a reduced pressure to the working side of the cylinder or of a flexible diaphragm mounted in a closed housing for movement against a spring biasing force upon the application of a reduced pressure to the working side of the diaphragm. The throttle modulator mechanism 16 is connected to control the position of a throttle valve 17 located within a high speed throat in the engine carburetor. The throttle modulator mechanism 16 is spring biased to maintain the throttle valve 17 fully open. When the valve 15 is closed by actuating the valve solenoid, the reduced pressure or vacuum applied from the source 14 causes the throttle modulator mechanism 16 to move the throttle valve 17 toward a closed position blocking the high speed carburetor throat. Or, in a modified embodiment, the throttle modulator mechanism 16 may be spring biased to maintain the throttle valve 17 closed. In this case, the vacuum is normally maintained on the throttle modulator mechanism 16 to open the throttle valve 17 and, when the valve 15 is actuated, the vacuum is disconnected from the throttle modulator mechanism 16 to allow the throttle valve 17 to close. If the valve 15 is pulsed rather than continuously actuated, the throttle modulator mechanism 16 will hold the throttle valve 17 at an intermediate position, depending upon the frequency and length of the pulses applied to the solenoid of the valve 15. However, it is preferable to have the throttle modulator mechanism 16 spring biased to fully open the throttle valve 17 when the valve 15 is unactuated. Then, in the event of a failure of the valve 15 or of any electrical portion of the control 10, the operation of the engine will not be affected other than the lack of speed governing. Pneumatic mechanisms 13 of the type described, are commercially available and are disclosed, for example, in the above-mentioned U.S. Pat. Nos. 2,867,196 and 3,811,418, and the disclosures of such patents are incorporated herein. Of course, it will be appreciated that the pneumatic mechanism 13 may be adapted to operate under compressed air or other fluid rather than from a vacuum, as will readily be apparent to those skilled in the pneumatic control art.

The electronic vacuum modulator circuit 11 for engine speed control generally comprises an engine speed signal generator 18, an engine speed signal conditioner 19, an engine speed detector 20 and a pulse rate modulator 21 which drives the solenoid actuated valve 15 in the pneumatic mechanism 13. The engine speed signal generator 18 is any conventional device for applying on an output 18' a signal having a variable which varies in proportion with the engine speed. The engine speed signal generator 18, for example, may consist of an electronic ignition system which is provided with a low voltage output in the form of a square wave having a frequency proportional to engine speed. Such an output is sometimes provided on electronic ignition systems for driving a tachometer or for other control purposes. The output 18' from the signal generator 18 is applied to the signal conditioner circuit 19 and thence to the engine speed detector 20. The engine speed detector 20 applies to an output 20' a signal having a waveform similar to that shown in FIG. 4. The output 20' from the engine speed detector 20 is dependent upon which of three speed ranges the engine is operated. Normally, the engine will be operated within safe speeds and the engine speed detector 20 will have a low output voltage. If the engine is operated within a narrow high speed range near a predetermined maximum engine speed, the speed detector 20 will have an output which varies proportionally and smoothly from a low voltage to a high voltage as the engine speed is increased over the narrow speed range to the predetermined maximum speed. Above this predetermined maximum speed, the speed detector 20 will have a high output voltage.

When the output 20' from the speed detector 20 is at the low voltage level, the pulse rate modulator 21 will have no output and the valve 15 will remain biased to its unactuated or open position permitting the engine to operate uninhibited. As the output 20' from the engine speed detector 20 increases from the low voltage level to the high voltage level, the pulse rate modulator 21 will provide a pulse output which gradually increases to a constant signal when the speed detector output 20' is at the high voltage level. Thus, over the narrow speed range, the valve 15 is pulsed at a rate which decreases as the speed increases to the predetermined maximum permissible speed, at which point the valve 15 is maintained continuously closed. As the valve 15 is progressively closed, there is a progressive increase in the vacuum on the working side of the modulator mechanism and the carburetor throttle valve 17 is progressively closed by the modulator mechanism 16. This forms a feedback system for maintaining a constant maximum engine speed without hunting since closing the throttle valve 17 decreases the available power from the engine. If the throttle valve 17 should be closed too far, the engine will slow down. The slower engine speed measured by the engine speed signal generator 18 is sensed by the engine speed detector circuit 20 which drives the pulse rate modulator 21 at a slower pulse rate to open the throttle valve 17. Through this arrangement, the engine is provided with maximum, uninhibited output as long as it is operated at speeds below the predetermined narrow high speed range. Within this narrow range, the control 10 will function to drive the engine at a constant speed with minimum hunting or oscillation about such speed.

When required, the control 10 also is provided with the electronic vacuum modulator circuit 12 for limiting the maximum speed of a vehicle in which the controlled engine is operated. The circuit 12 generally comprises a vehicle speed signal generator 22, a signal conditioner 23, and a vehicle speed detector 24. The output 24' of the vehicle speed detector 24 is applied through a summing junction 25, along with the output 20' from the engine speed detector 20, to the input of the pulse rate modulator 21. The vehicle speed generator 22 may be any type of generator connected for generating a signal having a variable which is directly proportional to the speed of the vehicle. For example, the vehicle speed signal generator 22 may consist of an alternating current generator which is driven from any portion of the vehicle drive train which rotates at a speed proportional to the vehicle speed. The generator 22 may be driven from, for example, a speedometer cable which is rotated by a gear within the vehicle transmission at a rate directly proportional to the vehicle speed. The generator 22 may be of a type which produces an alternating current signal having a frequency proportional to the speed at which it is rotated and, hence, proportional to the speed of the vehicle. The output 22' from the generator 22 is applied through the signal conditioner 23 to the vehicle speed detector 24. The vehicle speed detector 24 applies to the output 24' a signal of a form shown in FIG. 7. When the vehicle speed is less than a predetermined narrow high speed range, the speed detector 24 will have a low voltage output. As the vehicle speed continues to increase within the narrow high speed range to a predetermined maximum speed, the output from the speed detector 24 increases from the predetermined low voltage to a predetermined high voltage. Above the predetermined maximum vehicle speed, the speed detector 24 will maintain the high voltage output.

The pulse rate modulator 21 responds to the output from the vehicle speed detector 24 in a manner similar to which it responds to the output from the engine speed detector 20. Thus, as long as the vehicle speed detector 24 has a low voltage output, the pulse rate modulator 21 will have no output and the valve 15 will remain de-energized and open. As the output from the speed detector 24 increases, the pulse rate modulator 21 will provide a pulse output which similarly increases to progressively close the valve 15 at progressively lower pulse rates. When the output from the speed detector 24 reaches the predetermined maximum voltage, the pulse rate modulator 21 will maintain a continuous output on the valve 15 for holding the carburetor throttle valve 17 continuously closed. Thus, the engine will have full output power available to the vehicle wheels as long as the engine speed is below its predetermined narrow high speed range and as long as the vehicle speed is below its predetermined narrow high speed range. The output power available from the engine will be reduced when either the engine speed or the vehicle speed falls within their predetermined narrow control ranges. By providing separate engine speed and vehicle speed circuits, the engine may be operated in the more efficient higher speed ranges when the vehicle transmission is in a gear less than high gear and, when the vehicle transmission is shifted into high gear, the engine output will be limited to control the maximum vehicle speed. Both engine speed limiting and vehicle speed limiting take place in a narrow range to prevent the gradual drop in the engine power over a wide speed range as commonly occurs with prior art governors.

Figure 2:
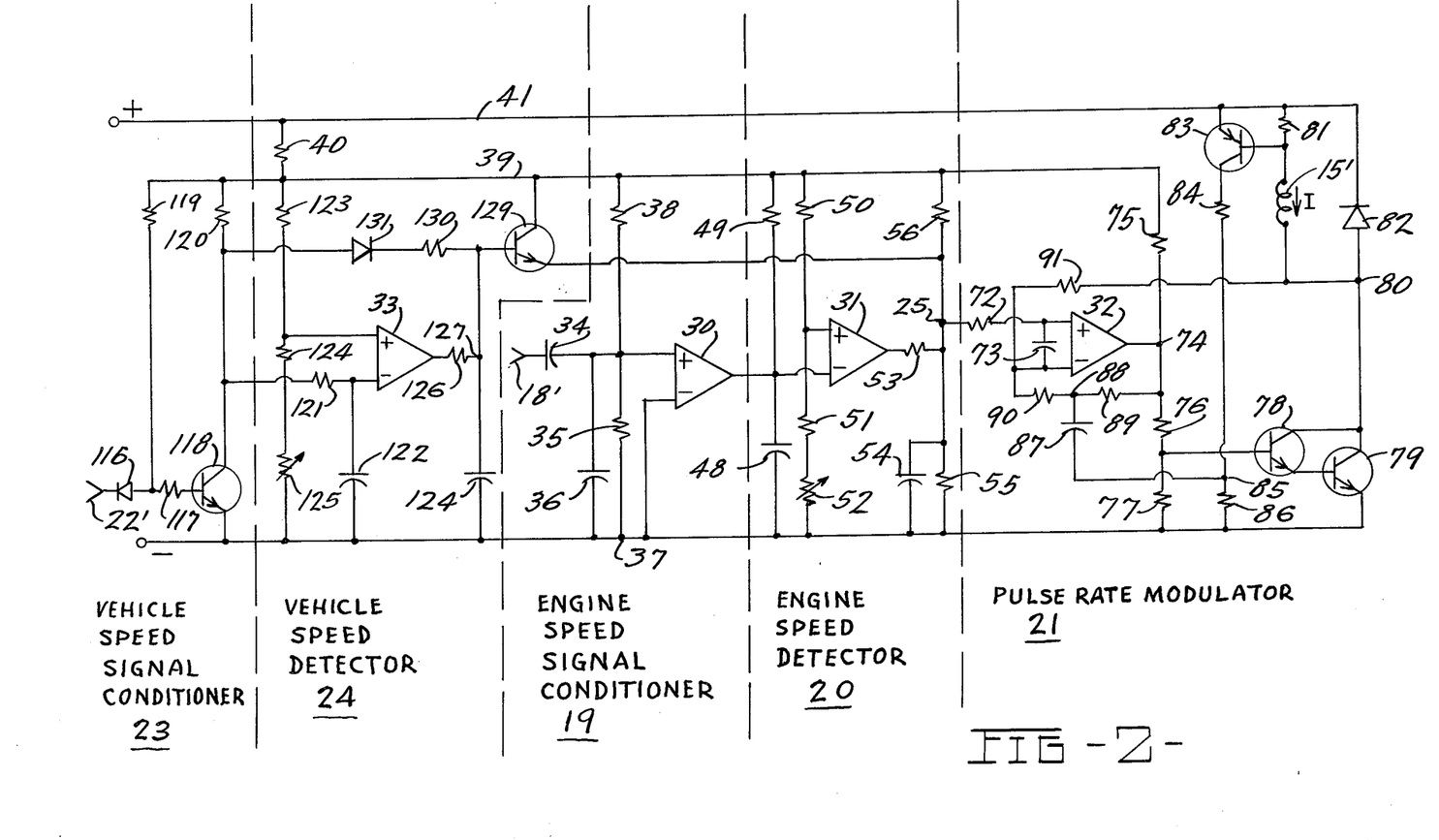
FIG. 2 is a detailed schematic diagram of the electronic vacuum modulator circuit shown in FIG. 1.

Turning now to FIG. 2, circuit details are shown for the electronic vacuum modulator circuits 11 and 12. The engine speed signal conditioner 19, the engine speed detector 20, the pulse rate modulator 21 and the vehicle speed detector 24 each includes, respectively, a comparator 30-33. The four comparators 30-33 are commercially available as a single integrated circuit package and each comparator has a high-impedance differential input circuit and an open-collector NPN output. The output from the comparators 30-33 will be open circuited as long as the positive input is at a higher voltage than the negative input and the output will be grounded whenever the positive input is at a lower voltage than the negative input. The comparator 30 is operated as a high-gain AC-coupled differential amplifier. The output 18' from the engine speed signal generator 18 (shown in FIG. 1) is connected through a capacitor 34 to the positive input of the comparator 30. The positive input of the comparator 30 is also connected through a resistor 35 and a capacitor 36, in parallel, to a negative bus 37. In a typical vehicle, the negative battery terminal is grounded and the negative bus 37 also will be grounded. The positive input to the comparator 30 is also connected through a resistor 38 to an intermediate voltage positive bus 39. The positive bus 39 is connected through a resistor 40 to a higher voltage positive bus 41. The positive and negative terminals of a battery (not shown) are connected between the bus 41 and the bus 37, respectively. The battery may be of any conventional type, such as the standard 12-volt battery normally found in vehicles for starting and operating the engine.

Figure 3:
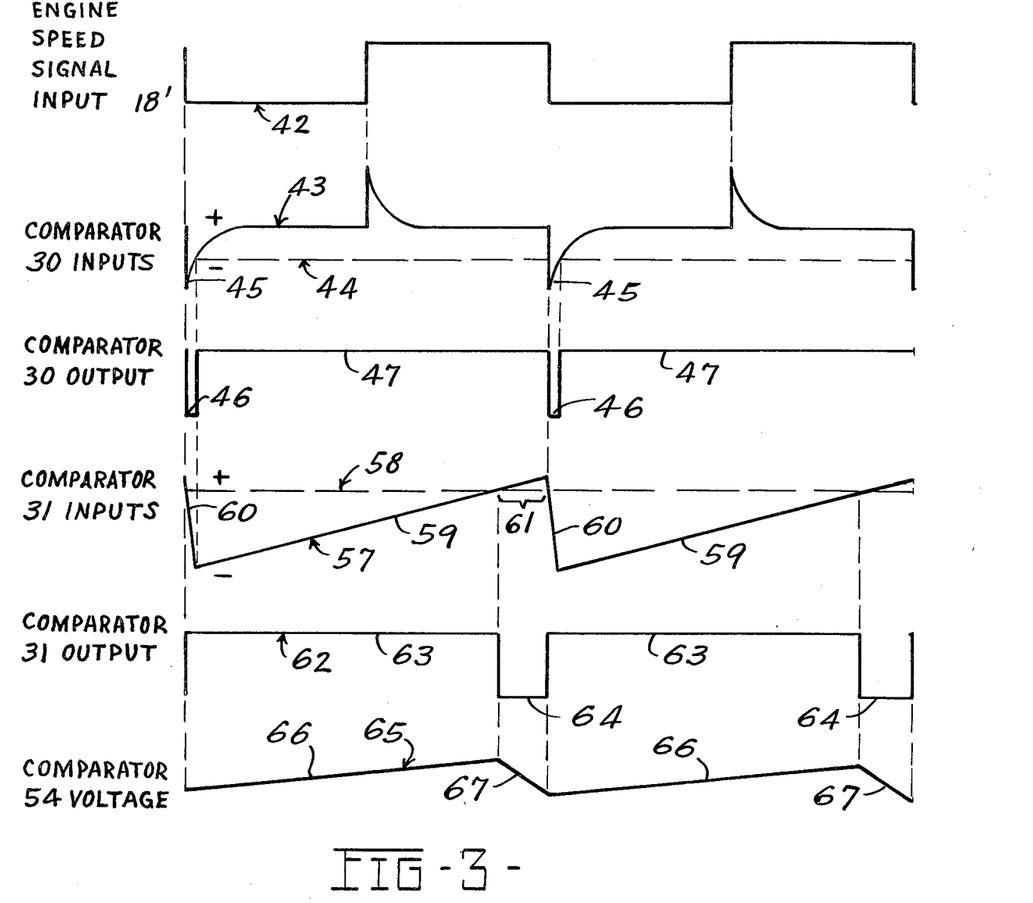
FIG. 3 is a graph showing typical signals appearing at preselected points in the engine speed signal conditioner and the engine speed detector portions of the circuit of FIG. 2.

Typical waveforms for the engine speed signal conditioner 19 are shown in FIG. 3. A square wave signal 42 is shown at the top of FIG. 3 as a typical signal applied to the engine speed signal conditioner 19 from the output 18' of the engine speed signal generator 18. The signal 42 typically will be in the form of a low amplitude square wave spark rate signal provided from an electronic ignition system. The square wave signal 42 is applied through the capacitor 34 to the capacitor 36 and a voltage divider consisting of the resistors 35 and 38 and to the positive input of the comparator 30. The square wave signal 42 is modified to appear as a signal 42. The negative input to the comparator 30 is grounded or connected to the negative bus 37 and has a magnitude with respect to the signal 43 which is represented by the dashed line 44. The signal 43 on the positive input to the comparator 30 is normally maintained positive by the voltage divider consisting of the resistors 35 and 38. However, whenever the engine speed signal 42 changes in a negative direction, a negative going pulse 45 of short duration will pass through the capacitor 34 and appear on the positive input to the comparator 30. During the short interval that the pulse 45 is negative or less than the grounded or neutral signal 44 appearing on the negative input to the comparator 30, the comparator 30 will have a grounded output, as represented by the graph line 46. The remainder of the time, the output of the comparator 30 will float at a voltage level above the neutral or grounded voltage on the negative bus 37, as represented by the graph line 47. Thus, the output from the comparator 30, which is operated as a differential amplifier, will normally float above ground in an open circuit condition and will provide grounded pulses 46 of a short duration each time the engine speed signal 42 changes in a negative direction. It should be noted here that the graph line 47 is merely representative of the open circuited output from the comparator 30 and that the actual voltage appearing on the output from the comparator 30 will be determined by the circuitry connected thereto. In essence, the comparator 30 functions as a switch which is alternately closed to connect its output to the negative bus 37 and opened.

Referring again to FIG. 2, the output from the comparator 30 forms the output from the engine speed signal conditioner 19 and is applied to the engine speed detector 20. The output from the comparator 30 is applied directly to the negative input of the comparator 31. The negative input of the comparator 31 is also connected through a capacitor 48 to the negative bus 37 and through a resistor 49 to the positive bus 39. The positive input to the comparator 31 is connected through a resistor 50 to the positive bus 39 and through a series fixed resistor 51 and variable resistor 52 to the negative bus 37. The series resistors 50, 51 and 52 form a voltage divider for determining the voltage on the positive input to the comparator 31, which voltage may be varied by varying the resistor 52. Optionally, the resistors 51 and 52 may be combined into a single fixed resistor to eliminate control over the voltage on the positive input to the comparator 31. A resistor 53 is connected from the output of the comparator 31 to the summing junction 25. The junction 25 is connected through a parallel capacitor 54 and resistor 55 to the negative bus 37 and also through a resistor 56 to the positive bus 39.

Typical operating signals appearing at preselected points in the engine speed detector 20 are also shown in FIG. 3. These signals are shown in relationship with the above-described signals in the engine speed signal conditioner 19. The actual negative input signal to the differential amplifier or comparator 31 is shown by the curve 57. The positive input to the differential amplifier 31 is shown by the straight dashed line 58 which represents a constant voltage, as established by the voltage divider resistors 50, 51 and 52. It will be appreciated here that the capacitor 48 and the resistor 49 modify the output from the differential amplifier 30 to form a general sawtooth shape to the negative input signal 57 to the differential amplifier 31. As long as the amplifier 30 has a free floating output 47, the capacitor 48 will charge through the resistor 49 generally along a curve 59. During the short interval that the differential amplifier 30 has a negative or grounded output 46, the capacitor 48 is rapidly discharged through the amplifier 30, as shown by the segment 60 of the curve 57. It should be noted that the signal 57 on the negative input to the comparator 31 exceeds the constant voltage 58 on the positive input to the comparator 31 during a time interval 61. The actual length of this time interval 61 will depend upon the voltage level of the signal 58 on the positive input to the amplifier 31 and also upon the operating speed of the engine. The time interval 61 decreases with an increase in engine speed up to a predetermined maximum speed, at which point the negative input signal 57 is always below the positive input signal 58.

The differential amplifier 31 will have an output as shown by the curve 62 which has segments 63 which represent the open circuit occurring during most of the cycle and segments 64 which represent a grounded output occurring during the time interval 61. It should be appreciated from studying the graphs in FIG. 3 that as the speed of the engine is increased, the point along the curve segment 59 at which the output from the differential amplifier 30 is grounded to discharge the capacitor 48 moves to the left. In other words, the peak voltage on the capacitor 48 gradually decreases. Depending upon the setting of the variable resistor 52, at some predetermined maximum engine speed, the negative input to the differential amplifier 31 will cease to exceed the voltage on the positive input as shown by the graph curve 58. At this point, the comparator or differential amplifier 31 will have a continuous open circuit output 63. The actual engine speed at which this condition occurs may be selected by adjusting the variable resistor 52 to set the voltage on the positive input to the differential amplifier 31.

The output from the differential amplifier 31 is connected through the resistor 53 to the summing junction 25 which forms the input to the pulse rate modulator 21. The parallel capacitor 54 and resistor 55 and the resistor 56 are also connected to the junction 25. During normal operation of the engine, the capacitor 54 will have a voltage across it as represented by a curve 65 in FIG. 3. The capacitor 54 will gradually charge through the resistor 56 during the time interval that the output from the differential amplifier 31 is open circuited, as shown by a segment 66 of the curve 65. During the time interval that the amplifier 31 has a grounded output, the capacitor 54 will discharge through the resistor 53 as shown by a segment 67 of the curve 65. The resistors 53, 55 and 56 and the capacitor 54 comprise a filter which provides the DC control voltage to the pulse rate modulator 21. The operation of the circuit incorporating the capacitor 54 may be best understood by reference to FIG. 4 and also considering the DC level on the capacitor 54 independently of the ripple component shown in the curve 65 of FIG. 3. To maintain a given DC voltage level on the capacitor 54, the average current into the capacitor 54 from the voltage divider consisting of the resistors 55 and 56 must equal the average current flowing out of the capacitor 54 through the resistor 53. If the two equal average currents result from highly unequal instantaneous currents, then the times must also be highly unequal. By choosing the resistor 53 much smaller than the resistors 55 and 56, the voltage on the capacitor 54 can be constrained to reach the middle of its range for the condition where the output of the amplifier 31 is low for a small part of the total period of the engine speed signal. This in turn requires that the sawtooth voltage appearing on the capacitor 48 must exceed the reference DC voltage on the positive input to the amplifier 31 only near the tip of the sawtooth. Having the voltage on the capacitor 54 go through its range while the peak of the sawtooth is near the reference DC level is the basis of the ability of the circuit to operate within a narrow speed range.

Figure 4:
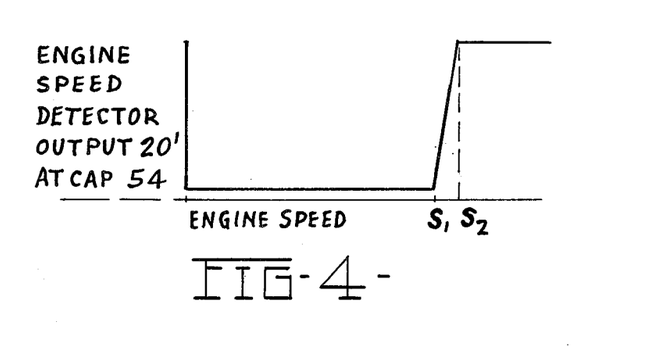
FIG. 4 is a graph showing a control signal generated in response to the engine speed for driving the pulse rate modulator.

As shown in FIG. 4, the average voltage at the summing junction 25, or across the capacitor 54, will have a low level when the engine speed is less than a speed $S_1$, will smoothly and progressively increase to a high level as the engine speed increases over a narrow range from a speed $S_1$ to a predetermined maximum speed $S_2$ and, for all speeds above the predetermined maximum speed $S_2$ will maintain a constant high level. The actual narrow speed range between $S_1$ and $S_2$ can be made either more or less narrow by choice of the resistors 53, 55 and 56. It should be noted that the filter will operate without the use of the resistor 55. However, high voltage levels across the capacitor 54 are not required and the use of the voltage divider comprising the resistors 55 and 56 reduces voltage ripple without degrading the system response when sudden changes in the voltage across the capacitor 54 are required. It should also be noted that the predetermined maximum engine speed, as represented by $S_2$ on the graph of FIG. 4, is determined by the engine speed at which the negative input to the differential amplifier 31 ceases to exceed the positive input to such amplifier 31 in each cycle.

Referring again to FIG. 2, the pulse rate modulator 21 includes the comparator 32 which basically is operated as a Schmitt trigger with an RC timing network and a variable level threshold which is determined by the voltage on the summing junction 25. The junction 25 is connected through a resistor 72 to the positive input to the comparator 32. A capacitor 73 is connected between the positive and negative inputs to the comparator 32 to function in combination with the resistor 72 as a filter for preventing false triggering of the pulse rate modulator 21 by ripple appearing on the DC voltage on the junction 25. The output from the comparator 32 is connected to a junction 74 which in turn is connected through a resistor 75 to the positive bus 39 and through two series resistors 76 and 77 to the negative bus 37. The junction between the series resistors 76 and 77 is connected to the base of a transistor 78. The transistor 78 and a transistor 79 are Darlington connected, with the collectors of the transistors 78 and 79 connected together to a junction 80, the emitter of the transistor 78 connected to the base of the transistor 79 and the emitter of the transistor 79 connected to the negative bus 37. The transistors 78 and 79 control current flow through a winding 15' of the solenoid controlled valve 15 of FIG. 1. The solenoid winding 15' is connected from the junction 80 through a current sensing resistor 81 to the positive bus 41. Thus, when the pair of transistors 78 and 79 are conducting, the solenoid winding 15' and the series current sensing resistor 81 are effectively connected between the positive bus 41 and the negative bus 37. The voltage appearing across the current sensing resistor 81 is directly proportional to the current through the solenoid winding 15' at the low current levels of interest. A reverse biased diode 82 is connected from the junction 80 to the positive bus 41, across the series solenoid winding 15' and the current sensing resistor 81. When the transistors 78 and 79 are switched from a conducting state to a nonconducting state, energy stored within a magnetic field in the solenoid 15 is discharged through the diode 82 and the current sensing resistor 81. The emitter and base of a transistor 83 are connected across the current sensing resistor 81 and carry a portion of the current through the solenoid winding 15'. The transistor 83 will conduct as long as a current greater than a small threshold current is flowing through the solenoid winding 15' to establish a low voltage across the resistor 81. The collector of the transistor 83 is connected through a resistor 84 to a junction 85. A resistor 86 is then connected from the junction 85 to the negative bus 37 and a capacitor 87 is connected from the junction 85 to a junction 88. The junction 88 is connected through a resistor 89 to the junction 74 at the output from the comparator 32 and also is connected through a resistor 90 to the negative input to the comparator 32. A feedback resistor 91 is connected from the negative input to the comparator 32 to the junction 80.

As previously indicated, the engine speed detector 20 normally applies a low voltage on the summing junction 25, as long as the engine speed is below the speed $S_1$, as shown in FIG. 4. Under these conditions, the positive input to the comparator 32 will always have a lower voltage than the negative input to the comparator 32, thereby causing the comparator 32 to have a grounded output on the junction 74 at all times. This in turn grounds the base to the transistor 78, causing the pair of transistors 78 and 79 to remain in a nonconducting state. As a consequence, no current will flow in the solenoid winding 15'.

Under the other extreme condition, the engine speed will equal or exceed the predetermined maximum permissible speed $S_2$. This may happen, for example, if the vehicle is coasting down a steep incline while in high gear. Under this condition, a high voltage will appear on the summing junction 25 at the output of the engine speed detector 20. This causes the positive input to the comparator 32 to always remain at a voltage higher than the voltage on the negative input to the comparator 32 and the output of the comparator 32 will appear as an open circuit. The voltage divider consisting of the resistors 75, 76 and 77 now applies a biasing voltage to the base of the transistor 78 to maintain the pair of transistors 78 and 79 in a fully conducting state. Under this condition, a constant current will flow through a solenoid winding 15' to hold the throttle valve 17 (FIG. 1) in a fully closed position.

Within the narrow speed range between $S_1$ and $S_2$, current through the solenoid winding 15' is pulled to control the setting of the throttle valve 17 and, hence, to control the maximum speed of the engine. The actual pulse rate is determined by the voltage applied from the summing junction 25 to the positive input to the comparator 32 and by an RC timing network including the capacitor 87 and the resistor 89. The pulse width is controlled by a circuit which includes the current sensing resistor 81, the transistor 83 and the resistors 84 and 86.

Figure 5:
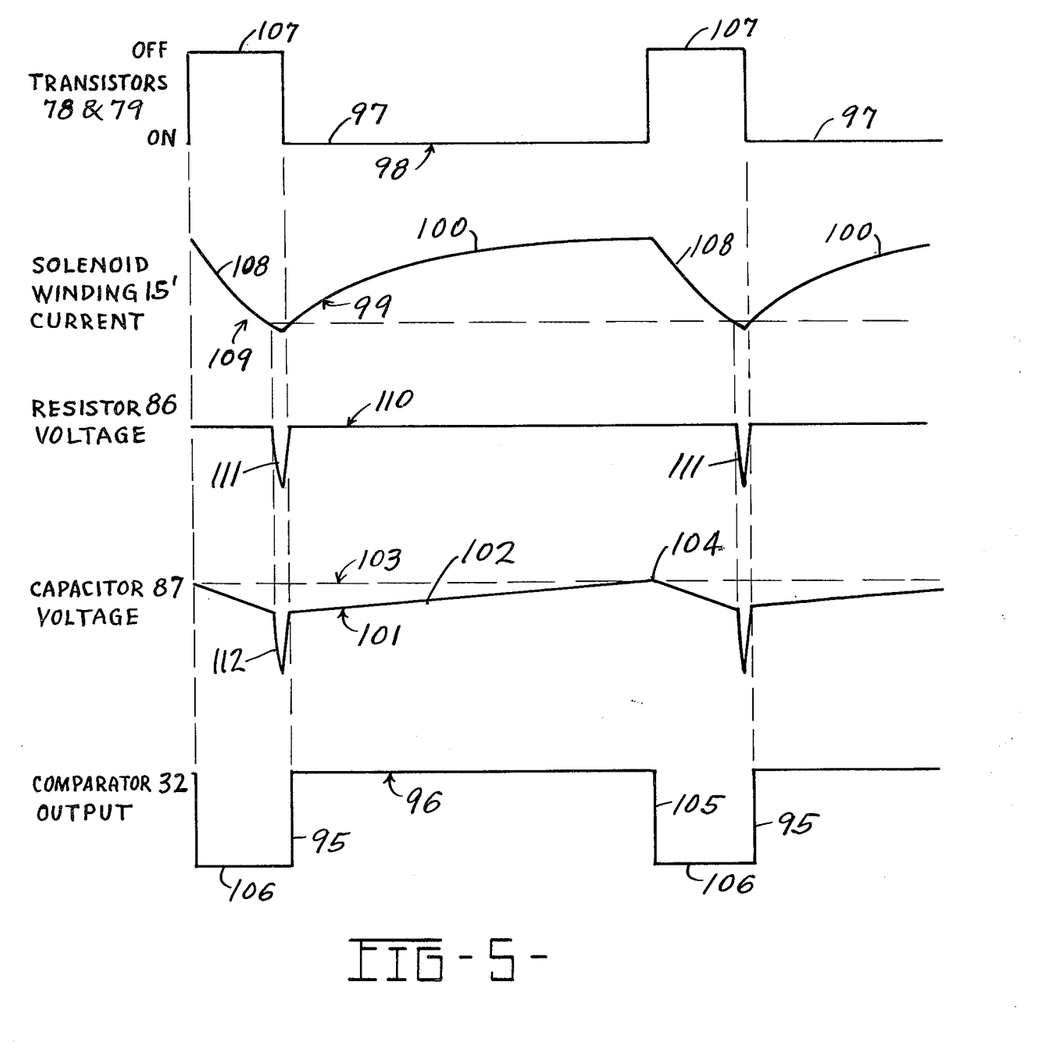
FIG. 5 is a graph showing typical signals appearing at preselected points in the pulse rate modulator portion of the circuit of FIG. 2.

Referring now to both FIGS. 2 and 5, the operation of the pulse rate modulator 21 will be considered within the narrow high speed regulating range between the engine speed $S_1$ and the predetermined maximum engine speed $S_2$. It will be assumed that the engine is operating at a point within this range and, accordingly, an intermediate level voltage is applied from the summing junction 25 through the resistor 72 to the positive input of the comparator 32. For a starting point in the description of a cycle of the pulse rate modulator 21, it will be assumed that the voltage on the positive terminal to the comparator 32 has just increased to a point wherein it exceeds the voltage on the negative input to the comparator 32. At this instant, the output from the comparator 32 goes from ground to open circuit, as shown in FIG. 5 by the segment 95 of a graph curve 96 for the comparator output. At this instant, the junction 74 is no longer grounded and the voltage divider consisting of the resistors 75, 76 and 77 biases the Darlington connected transistors 78 and 79 into a conducting state, as shown along the segment 97 of an output curve 98 for the transistors 78 and 79. A curve 99 shows the actual current through the solenoid winding 15'. When the transistors 78 and 79 are conducting, the current in the solenoid winding 15' increases along a segment 100 of the curve 99. The voltage on the timing capacitor 87 is shown by a curve 101. During the time that current flows through the solenoid winding 15' and the conducting transistors 78 and 79, voltage on the junction 74, as determined by the voltage divider resistors 75, 76 and 77, charges the capacitor 87 through the resistor 89. This charging of the capacitor 87 is shown by a segment 102 of the curve 101. The voltage across the capacitor 87 is applied through the resistor 90 to the negative input to the comparator 32. A line 103 shows the voltage on the positive input to the comparator 32 in relation to the voltage on the negative input. At a point 104, the voltage across the capacitor 87 reaches the voltage on the positive input to the comparator 32. At the point 104, the output 96 from the comparator 32 switches along a line 105 from free floating to a grounded potential 106. This in turn grounds the base of the transistor 78 to switch the Darlington connected transistors 78 and 79 to an off, or nonconducting condition, as shown by a segment 107 of the curve 98.

When the transistors 78 ad 79 are switched off, energy stored within the magnetic field established about the solenoid winding 15' begins to discharge through the diode 82 and the current sensing resistor 81. The discharging of energy from the solenoid winding 15' is shown along a segment 108 of the curve 99 which depicts the solenoid winding current. At some predetermined minimum solenoid winding current represented by the dashed line 109, the voltage appearing across the current sensing resistor 81 ceases to be sufficient to hold the transistor 83 on or in a conducting state. At this point, the transistor 83 is switched off to effectively open the circuit between the positive bus 41 and the series resistors 86 and 84. The voltage across the resistor 86 is shown by a curve 110 and will have a negative spike 111 at the instant that the transistor 83 becomes nonconducting since no current will flow from the bus 41 through the resistor 84 and one side of the resistor 86 is connected to the negative bus 37. This negative spike 111 appearing on the junction 85 passes through the capacitor 87, as shown by a segment 112 of the capacitor voltage curve 101, and is applied through the resistor 90 to the negative input of the comparator 32. The negative voltage pulse 112 is sufficient to rapidly switch the comparator 32 to a free floating output, along the segment 95 of the comparator output curve 96. At this point, the transistors 78 and 79 again will be biased on and the cycle will be repeated. As the speed of the engine increases between $S_1$ and $S_2$, it should be noted that an increasing voltage will be applied to the positive input to the comparator 32. This in effect increases the threshold voltage of the Schmitt trigger. As a consequence, the curve 103 will be moved upward and a greater time will be required for the capacitor 87 to charge along the curve segment 102 to the switching voltage of the comparator 32. As the charging time for the capacitor 87 is increased, the time that the transistors 78 and 79 conduct, as represented by the curve segment 97, increases. This results in a decrease in the pulse rate to increase the average current through the solenoid winding 15' and thereby increase the degree to which the carburetor throttle valve 17 is closed. Thus, the setting of the valve 17 is controlled by the speed of the engine.

Figure 6:
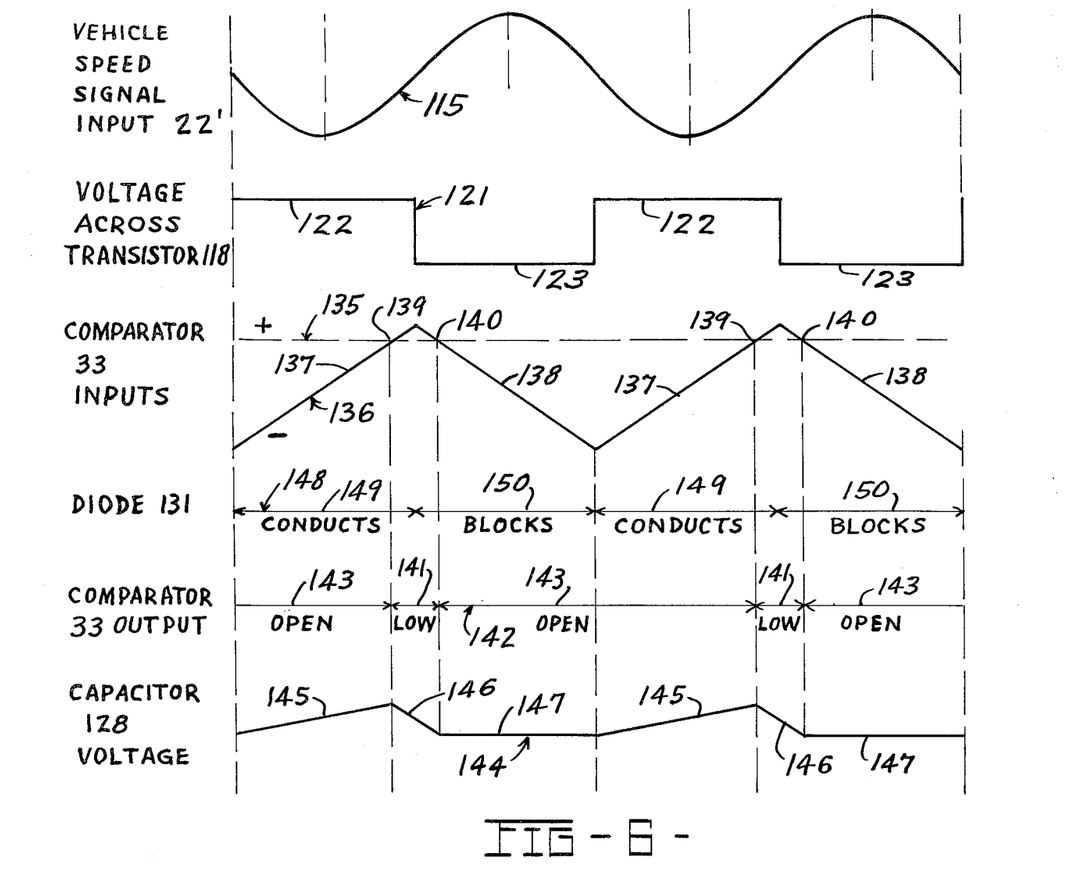
FIG. 6 is a graph showing typical signals appearing at preselected points in the vehicle speed signal conditioner and the vehicle speed detector portions of the circuit of FIG 2.

As previously indicated, it is sometimes desirable to provide the engine speed limiting control 10 with the electronic vacuum modulator circuit 12 for limiting the maximum speed of the vehicle in addition to limiting the maximum speed of the engine. In such case, it is necessary to attach the vehicle speed signal generator 22 to the vehicle to be driven from the vehicle drive train at a speed which is proportional to the vehicle speed. For the following discussion, it will be assumed that the vehicle speed signal generator 22 is a conventional alternating current generator which generates an output 22' having a frequency and an amplitude proportional to the vehicle speed. Such an alternating current output curve 115 is shown in the graph of FIG. 6. However, it should be appreciated that other waveforms, such as a square wave or a pulse signal having a frequency or other signal variable proportional to the vehicle speed also may be generated.

Referring again to FIG. 2, the output 22' from the vehicle speed signal generator 22 is applied through a diode 116 and a resistor 117 to the base of a transistor 118 which forms the vehicle speed signal conditioner 23. The junction between the diode 116 and the resistor 117 is connected through a resistor 119 to the positive bus 39. The emitter of the transistor 118 is connected directly to the negative bus 37, while the collector is connected through a pull-up resistor 120 to the positive bus 39. Referring to FIG. 6, it will be seen that a voltage in the form of the curve 121 appears across the transistor 118 and is in the general form of a square wave having a high voltage segment 122 when the output 22' from the vehicle speed signal generator 22 is negative and the transistor 118 is nonconducting and having a segment 123 which is low or at zero potential when the output 22' from the vehicle speed signal generator 22 is above zero or positive and the transistor 118 is conducting. Thus, the vehicle speed signal conditioner 23 generates an output signal which is generally in the form of a square wave signal which is independent from the amplitude of the vehicle speed signal generator output 22' and has the same frequency as the output 22' from the vehicle speed signal generator 22.

The output from the speed signal conditioner 23 is applied to the vehicle speed detector 24 which includes the comparator 33. The collector of the transistor 118 is connected through a resistor 121 to the negative input to the comparator 33. The comparator negative input is also connected through a capacitor 122 to the negative bus 37. The positive input to the comparator 33 is held at a fixed reference voltage determined by a voltage divider including a resistor 123 connected to the positive bus 39 and a series fixed resistor 124 and variable resistor 125 connected to the negative bus 37. The variable resistor 125 is adjusted to set the reference voltage on the positive input to the comparator 33. Or, in a modified embodiment, the variable resistor 125 and the fixed resistor 124 may be replaced with a single preselected fixed resistor. The output from the comparator 33 is connected through a resistor 126 to a junction 127, which is in turn connected through a capacitor 128 to the negative bus 37, to the base of a transistor 129 and through a series resistor 130 and diode 131 to the collector of the transistor 118 in the vehicle speed signal conditioner 23. The transistor 129 has a collector connected to the positive bus 39 and an emitter connected to the summing junction 25 at the output from the engine speed detector 20.

The operation of the vehicle speed detector 24 will best be understood by referring both to FIG. 4 and to the graph of FIG. 6. A dashed line 135 in FIG. 6 represents the fixed reference voltage appearing on the positive input to the comparator 33 while a curve 136 represents the signal applied to the negative input to the comparator 33. The signal 136 is generally in the form of a triangular wave which is generated through the alternate charging and discharging of the capacitor 122 through the resistor 121. Whenever the transistor 118 is in a nonconducting state, the capacitor 122 will charge through the resistors 121 and 120, as represented by the segments 137 of the curve 136. Whenever the transistor 118 is conducting, the capacitor 122 will discharge through the resistor 121 and the transistor 118, as represented by the segments 138 of the curve 136. Although the curve 136 is shown as a true triangular waveform, it should be appreciated that the segments 137 and 138 will actually be in the form of an asymptotic charging and discharging of the capacitor 122. It will be noted that at a point 139, the charge on the capacitor 122 exceeds the voltage on the positive input to the comparator 33 and that this condition continues until a point 140 wherein the charge on the capacitor 122 is discharged to a voltage below the voltage on the positive input to the comparator 33. Between the points 139 and 140, the comparator 33 will have a grounded or low output, as represented by a section 141 of a line 142. At other times, when the voltage on the negative input to the comparator 33 is less than the voltage on the positive input, the comparator 33 will have an open circuited or free floating output, as represented by a section 143 of the line 142.

A curve 144 represents the voltage appearing across the capacitor 128. The curve 144 includes a segment 145 wherein the capacitor 128 is charged through the resistor 130 and the diode 131 from the voltage appearing at the collector of the transistor 118, a segment 146 wherein the capacitor 128 is discharged through the resistor 126 and the grounded output from the comparator 33 and a segment 147 wherein the capacitor 128 is neither charged nor discharged to any appreciable degree. A line 148 is also provided to show the state of conduction of the diode 131. The diode 131 conducts along a segment 149 of the line 148 which coincides with the segment 122 of the curve 121 showing the voltage across the transistor 118. Similarly, the diode 131 is nonconducting during a segment 150 of the line 148 which coincides with the segment 123 of the curve 121 for when the transistor 118 is conducting. Thus, the capacitor 128 can be charged only during the time interval that the transistor 118 is nonconducting and the capacitor 128 is connected through the resistor 130, the diode 131 and the resistor 120 to the positive bus 39. On the other hand, when the transistor 118 is conducting, the diode 131 prevents discharge of the capacitor 128 through the resistor 130, the diode 131 and the conducting transistor 118.

Figure 7:
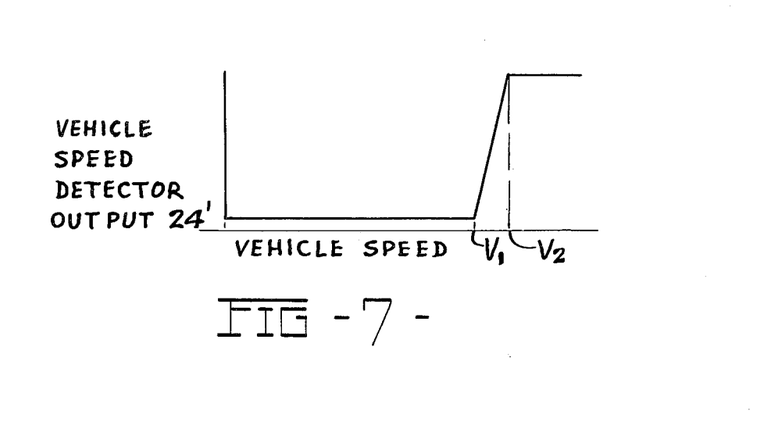
FIG. 7 is a graph showing a control signal generated in response to the vehicle speed for driving the pulse rate modulator.

During operation of the vehicle within normal speeds, or less than a velocity $V_1$ shown in FIG. 7, there is no adverse effect on the operation of the engine due to vehicle speed limiting, although the engine speed may be limited due to the speed limiting circuit 11 shown in FIG. 1. During this time, it will be noted from curve 144 in FIG. 6 that the capacitor 128 is completely discharged at some point during each cycle of the vehicle speed signal curve 115, namely, during the segment 147 of the curve 144. When the engine speed reaches the speed $V_1$, the time between the points 139 and 140 in which the output from the comparator 33 is grounded and the capacitor 128 is discharged along the segment 146 is insufficient to completely discharge the capacitor 128. The curve 144 will cease to have the segments 147 in each cycle. At this point, there will be an increase in the voltage appearing across the capacitor 128 sufficient to bias the transistor 129 into a limited state of conduction, as determined by the vehicle speed. When the transistor 129 is partially conducting, there is a voltage increase at the summing junction 25 across the capacitor 54. This voltage increase causes the solenoid winding 15' to be pulsed at a rate inversely proportional to the velocity of the vehicle in the narrow high speed range between the vehicle velocity $V_1$ and a predetermined maximum vehicle velocity $V_2$ shown in FIG. 7. When the vehicle speed reaches or exceeds the predetermined maximum vehicle velocity $V_2$, the negative input to the comparator 33, as represented by the curve 136, ceases to exceed the reference voltage on the positive input to the comparator 33, as represented by the curve 135. At this point, the comparator 33 will remain continuously in an open circuit condition and the capacitor 128 will charge to the voltage appearing on the collector of the transistor 118 when such transistor 118 is nonconducting. The transistor 129 will then be biased into a fully conducting state and apply a constant high voltage on the summing junction 125 which is sufficient to cause the pulse rate modulator 21 to maintain a constant current through the solenoid winding 15'.

The electronic vacuum modulator circuit 12 which includes the vehicle speed signal generator 22, the vehicle speed signal conditioner 23 and the vehicle speed detector 24, will not effect the operation of the engine as long as the vehicle speed or velocity is below $V_1$, and will gradually restrict the output power from the vehicle engine as the velocity is increased from $V_1$ to a predetermined maximum speed $V_2$, at which point the high speed carburetor throttle valve 17 will be held fully closed. Vehicle speed limiting occurs only in the narrow range between the speeds $V_1$ and $V_2$ and is independent of the actual engine speed. The transistor 129 functions as a buffer between the vehicle speed regulating function and the engine speed regulating function. In the first place, the transistor 129 prevents the varying impedance at the junction 25 from loading or affecting the voltage across the capacitor 128. Secondly, the transistor 129 provides sufficient drive to permit charging of the capacitor 54 to raise the voltage on the summing junction 25 under maximum vehicle speed conditions, even though the output of the comparator 31 may be grounded. On the other hand, if engine speed limiting occurs before the vehicle speed limit is reached, which might occur in the lower vehicle transmission gear ranges, the capacitor 54 can reach a high voltage level without loss of current to the transistor 129, since the voltage on the capacitor 54 does not exceed the emitter-base breakdown voltage of the transistor 129.

It will be appreciated that various changes and modifications may be made in the above-described control 10 for limiting the maximum speed of an internal combustion engine. For example, the engine speed signal generator 18 has been described as generating a square wave signal having a frequency proportional to the speed of the engine. Other conventional types of signal generators may also be used within the control 10. For example, the signal generator may be of a type which produces a voltage proportional to the speed of the engine. The circuit for the control 10 may then be modified to operate in response to the variable voltage engine speed signal. This may be accomplished, for example, by applying the variable voltage signal to a voltage-to-frequency converter which generates a signal having a frequency proportional to the engine speed. The vehicle speed signal generator 22 may also generate a signal having any variable which is varied in proportion to the vehicle speed. Such signal parameter may, for example, consist of a variable frequency, a variable voltage, or a constant frequency variable pulse width signal, as will be readily apparent to those skilled in the art.

The engine in which the control 10 has been described as operating, has been a carburetor-type internal combustion engine. It should also be appreciated that the control 10 may be adapted to other types of engines, such as a diesel engine, or a spark-ignited, fuel-injected internal combustion engine. In such case, the throttle valve is connected for limiting the flow of air through the engine intake manifold. It also should be noted that the throttle modulator mechanism 16 may be modified to operate in response to fluid pressure in place of a vacuum, as described above. Various other modifications and changes may be made in the invention without departing from the spirit and scope of the following claims.

What I claim is:

1. Apparatus for limiting the maximum operating speed of an internal combustion engine mounted for driving a vehicle comprising, in combination, means for generating a first electric signal having a frequency corresponding to the speed of the engine, means responsive to such first signal for establishing a second electric signal having a first value when the speed of the engine is below a predetermined narrow high speed range, a second value when the speed of the engine is above the predetermined narrow high speed range and, when the speed of the engine is in the predetermined narrow high speed range, a value between said first and second values and proportional to the engine speed, throttle valve means connected to the engine for progressively reducing the available power of the engine when progressively closed, means responsive to such second signal for progressively closing said throttle valve means as such second signal progressively changes from said first value to said second value, and wherein said means for establishing such second signal includes a capacitor, means for charging said capacitor during each cycle of said first signal for a time proportional to the time of such cycle and for discharging such capacitor durin each cycle for a predetermined fixed time interval, means for comparing the voltage on said capacitor with a reference voltage and having a first output whenever such reference voltage exceeds such capacitor voltage and having a second output whenever such capacitor voltage exceeds such reference voltage, means for applying a reference voltage to said comparing means equal to the maximum capacitor voltage in each cycle when said engine is operated at the maximum speed within the predetermined narrow high speed range, whereby said comparing means has a continuous second output whenever the speed of the engine is above the predetermined narrow high speed range, a second capacitor, means responsive to the second output from said comparing means for charging said second capacitor towards said second value, means responsive to the first output from said comparing means for discharging said second capacitor towards said first value, said last-named means discharging said second capacitor to said first value during each cycle of such first signal whenever the speed of the engine is below the predetermined narrow high speed range, and wherein said second signal comprises the voltage across said second capacitor.

2. Apparatus for limiting the maximum operating speed of an internal combustion engine, as set forth in claim 1, wherein said means for progressively closing said throttle valve means includes a solenoid actuated valve, means responsive to the actuation of said solenoid actuated valve for closing said throttle means, means for opening said throttle valve means when said solenoid actuated valve is unactuated, and pulse rate modulator means for energizing said solenoid actuated valve in response to such second signal, said modulator means applying an average current to energize said solenoid actuated valve when such second signal is greater than said first value which progressively increases as such second signal progressively changes from said first value to said second value to progressively actuate said valve.

3. Apparatus for limiting the maximum operating speed of an internal combustion engine, as set forth in claim 1, and further including means for generating a third electric signal having a variable corresponding to the velocity of the vehicle, means responsive to such third signal for establishing a fourth electric signal having substantially said first value when the velocity of the vehicle is below a predetermined narrow high velocity range, substantially said second value when the velocity of the vehicle is above the predetermined narrow high velocity range and, when the velocity of the vehicle is in the predetermined narrow high velocity range, a value between said first and second values and proportional to the vehicle velocity, and wherein said means responsive to such second signal is also responsive to such fourth signal for progressively closing said throttle valve means as such fourth signal progressively changes from said first value to said second value.

4. Apparatus for limiting the maximum operating speed of an internal combustion engine, as set forth in claim 3, wherein said means for progressively closing said throttle valve means includes a solenoid actuated valve, means responsive to the actuation of said solenoid actuated value for closing said throttle valve means, means for opening said throttle valve means when said solenoid actuated valve is unactuated, and pulse rate modulator means for energizing said solenoid actuated valve in response to such second and fourth signals, said modulator means applying an average current to energize said solenoid actuated valve when either of such second and fourth signals is greater than said first value which progressively increases as either of such second and fourth signals progressively changes from said first value to said second value to progressively actuate said valve.

* * * * *